United States Patent
Jung et al.

(10) Patent No.: US 12,319,318 B2
(45) Date of Patent: Jun. 3, 2025

(54) CONTROLLER, CONTROL METHOD, AND NON-TRANSITORY COMPUTER READABLE MEDIA

(71) Applicant: TOYOTA JIDOSHA KABUSHIKI KAISHA, Toyota (JP)

(72) Inventors: Hojung Jung, Shizuoka-ken (JP); Hiromitsu Urano, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 200 days.

(21) Appl. No.: 17/967,440

(22) Filed: Oct. 17, 2022

(65) Prior Publication Data

US 2023/0129168 A1 Apr. 27, 2023

(30) Foreign Application Priority Data

Oct. 21, 2021 (JP) ................. 2021-172517

(51) Int. Cl.
*B60W 60/00* (2020.01)

(52) U.S. Cl.
CPC ... *B60W 60/0027* (2020.02); *B60W 2554/402* (2020.02)

(58) Field of Classification Search
CPC ....... B60W 60/0027; B60W 2554/402; B60W 60/007
See application file for complete search history.

(56) References Cited

U.S. PATENT DOCUMENTS

| | | | | |
|---|---|---|---|---|
| 2018/0224932 A1* | 8/2018 | Von Novak | ............. | G06F 3/013 |
| 2022/0410937 A1* | 12/2022 | Parasuram | ........... | G05D 1/0214 |
| 2023/0103248 A1* | 3/2023 | Abrash | ................. | B60W 10/18 |
| | | | | 701/26 |
| 2023/0282106 A1* | 9/2023 | Silver | .................... | H04R 3/005 |
| | | | | 340/902 |

FOREIGN PATENT DOCUMENTS

| | | |
|---|---|---|
| JP | 2019-034648 A | 3/2019 |
| JP | 2020-525885 A | 8/2020 |
| WO | 2019-005791 A1 | 1/2019 |

* cited by examiner

*Primary Examiner* — Peter D Nolan
*Assistant Examiner* — Chanmin Park
(74) *Attorney, Agent, or Firm* — Dinsmore & Shohl LLP

(57) ABSTRACT

A controller for a vehicle capable of autonomous driving. The controller executes detecting an emergency vehicle traveling around the vehicle based on surrounding environment information, and determining how to deal with the emergency vehicle in response to a detection of the emergency vehicle. In the determining how to deal with the emergency vehicle, the controller executes, at least, determining to cause the vehicle to take an avoidance action for the emergency vehicle, and determining to cause the vehicle to take a preliminary action for the avoidance action.

11 Claims, 10 Drawing Sheets

| EMERGENCY VEHICLE IS DETECTED | | EMERGENCY VEHICLE IS NOT DETECTED |
|---|---|---|
| DETECTION RELIABILITY ≧ FIRST THRESHOLD | DETECTION RELIABILITY < FIRST THRESHOLD | |
| AVOIDANCE ACTION | PRELIMINARY ACTION | NORMAL AUTONOMOUS DRIVING |

*FIG. 1*

|  | EMERGENCY VEHICLE IS DETECTED | | EMERGENCY VEHICLE IS NOT DETECTED |
| --- | --- | --- | --- |
|  | DETECTION RELIABILITY ≥ FIRST THRESHOLD | DETECTION RELIABILITY < FIRST THRESHOLD | |
| PREDICTION RELIABILITY ≥ SECOND THRESHOLD | AVOIDANCE ACTION | PRELIMINARY ACTION | NORMAL AUTONOMOUS DRIVING |
| PREDICTION RELIABILITY < SECOND THRESHOLD | PRELIMINARY ACTION | | |

*FIG. 5*

|  | EMERGENCY VEHICLE IS DETECTED | | EMERGENCY VEHICLE IS NOT DETECTED |
|---|---|---|---|
|  | DETECTION RELIABILITY ≥ FIRST THRESHOLD | DETECTION RELIABILITY < FIRST THRESHOLD |  |
| CONFIDENCE LEVEL ≥ THIRD THRESHOLD | AVOIDANCE ACTION | SPECIFIC PRELIMINARY ACTION | NORMAL AUTONOMOUS DRIVING |
| CONFIDENCCE LEVEL < THIRD THRESHOLD | SWITCH OPERATION | PRELIMINARY ACTION | |

FIG. 8

CONTROLLER, CONTROL METHOD, AND NON-TRANSITORY COMPUTER READABLE MEDIA

CROSS-REFERENCE TO RELATED APPLICATION

The present application claims priority under 35 U.S.C. § 119 to Japanese Patent Application No. 2021-172517, filed Oct. 21, 2021, the contents of which application are incorporated herein by reference in their entirety.

BACKGROUND

Technical Field

The present disclosure relates to a technique for a vehicle capable of autonomous driving. Especially, the present disclosure relates to a technique for dealing with an emergency vehicle.

Background Art

While driving a vehicle, in a case where an emergency vehicle is traveling around and is expected to interfere with the traveling route of the vehicle, it is required to perform an avoidance action for the emergency vehicle so as not to hinder traveling of the emergency vehicle. In autonomous driving of level 3 or higher, it is necessary for the system to autonomously cope with such an emergency vehicle. For this reason, development of autonomous driving techniques for dealing with emergency vehicles has been advanced.

For example, Patent Literature 1 discloses a technique of estimating an orientation of an emergency vehicle by detecting siren noise corresponding to the emergency vehicle using a plurality of microphones, identifying a part of a roadway on which the emergency vehicle is traveling by comparing the estimated orientation with map information, determining how to deal with the emergency vehicle based on the estimated orientation and the identified part of the roadway, and controlling the vehicle in an autonomous driving mode based on the determined response.

LIST OF RELATED ART

Patent Literature 1: Japanese Laid-Open Patent Application Publication No. JP-2020-525885

SUMMARY

In autonomous driving of a vehicle for dealing with an emergency vehicle, it is necessary to detect the emergency vehicle traveling around the vehicle based on surrounding environment information of the vehicle. However, for example, in a case where the emergency vehicle has not yet traveled sufficiently close to the vehicle, the emergency vehicle may be erroneously detected due to the influence of noise. Therefore, if it is determined to cause the vehicle to take an avoidance action for the emergency vehicle immediately in response to the detection of the emergency vehicle, there is a possibility that the vehicle take the avoidance action unnecessarily. As a result, smooth autonomous driving may be inhibited. On the other hand, if the vehicle does not take the avoidance action until the detection is sufficiently performed, there is a possibility that the performance of dealing with the emergency vehicle cannot be ensured, for example, the dealing with the emergency vehicle cannot be performed in time.

An object of the present disclosure is to provide a technique, for capable of ensuring performance of dealing with an emergency vehicle while suppressing an unnecessary avoidance action associated with erroneous detection of the emergency vehicle.

A first disclosure is directed to a controller for a vehicle capable of autonomous driving.

The controller is configured to execute:
detecting an emergency vehicle traveling around the vehicle based on surrounding environment information; and
determining how to deal with the emergency vehicle in response to a detection of the emergency vehicle,
wherein the determining how to deal with the emergency vehicle at least includes:
determining to cause the vehicle to take an avoidance action for the emergency vehicle; and
determining to cause the vehicle to take a preliminary action for the avoidance action.

A second disclosure is directed to a controller further having the following features with respect to the controller according to the first disclosure.

The controller is further configured to execute calculating a detection reliability that shows a reliability of detection of the emergency vehicle.

The determining how to deal with the emergency vehicle includes:
causing the vehicle to take the avoidance action for the emergency vehicle when the detection reliability exceeds a first threshold; and
causing the vehicle to take the preliminary action while the detection reliability is less than the first threshold.

A third disclosure is directed to a controller further having the following features with respect to the controller according to the first disclosure.

The controller is further configured to execute:
calculating a detection reliability that shows a reliability of detection of the emergency vehicle; and
calculating a prediction reliability that shows a reliability of a predicted traveling route of the emergency vehicle.

The determining how to deal with the emergency vehicle includes:
causing the vehicle to take the avoidance action for the emergency vehicle when the detection reliability exceeds a first threshold and the prediction reliability exceeds a
causing the vehicle to take the preliminary action while the detection reliability is less than the first threshold or the prediction reliability is less than the second threshold.

A fourth disclosure is directed to a controller further having the following features with respect to the controller according to the first disclosure.

The vehicle is configured to be able to be operated by remote or manual driving.

The controller is further configured to execute:
calculating a detection reliability that shows a reliability of detection of the emergency vehicle; and
calculating a confidence level that shows confidence in completing the avoidance action for the emergency vehicle.

The determining how to deal with the emergency vehicle includes:

causing the vehicle to take the avoidance action for the emergency vehicle when the detection reliability exceeds a first threshold and the confidence level exceeds a third threshold;

switching operation of the vehicle to the remote or manual driving when the detection reliability exceeds the first threshold and the confidence level is less than the third threshold; and causing the vehicle to take the preliminary action while the detection reliability is less than the first threshold.

A fifth disclosure is directed to a controller further having the following features with respect to the controller according to the fourth disclosure.

The preliminary action includes a specific preliminary action.

The determining how to deal with the emergency vehicle includes causing the vehicle to take the specific preliminary action while the detection reliability is less than the first threshold and the confidence level exceeds the third threshold.

A sixth disclosure is directed to a controller further having the following features with respect to the controller according to the fourth disclosure.

The determining how to deal with the emergency vehicle includes issuing an alert notifying that there is anticipation of switching operation of the vehicle to the remote or manual driving while the detection reliability is less than the first threshold and the confidence level is less than the third threshold.

A seventh disclosure is directed to a control method for a vehicle of autonomous driving.

The control method includes:
detecting an emergency vehicle traveling around the vehicle based on surrounding environment information; and
determining how to deal with the emergency vehicle in response to a detection of the emergency vehicle, wherein
the determining how to deal with the emergency vehicle at least includes:
determining to cause the vehicle to take an avoidance action for the emergency vehicle; and
determining to cause the vehicle to take a preliminary action for the avoidance action.

An eighth disclosure is directed to a control method having the following features with respect to the controller according to the seventh disclosure.

The control method further includes calculating a detection reliability that shows a reliability of detection of the emergency vehicle.

The determining how to deal with the emergency vehicle includes:
causing the vehicle to take the avoidance action for the emergency vehicle when the detection reliability exceeds a first threshold; and
causing the vehicle to take the preliminary action while the detection reliability is less than the first threshold.

A ninth disclosure is directed to a control method having the following features with respect to the controller according to the seventh disclosure.

The control method further includes:
calculating a detection reliability that shows a reliability of detection of the emergency vehicle; and
calculating a prediction reliability that shows a reliability of a predicted trajectory of the emergency vehicle.

The determining how to deal with the emergency vehicle includes:

causing the vehicle to take the avoidance action for the emergency vehicle when the detection reliability exceeds a first threshold and the prediction reliability exceeds a second threshold; and causing the vehicle to take the preliminary action while the detection reliability is less than the first threshold or the prediction reliability is less than the second threshold.

A tenth disclosure is directed to a control method having the following features with respect to the controller according to the seventh disclosure.

The vehicle is configured to be able to be operated by remote or manual driving.

The control method further includes:
calculating a detection reliability that shows a reliability of detection of the emergency vehicle; and
calculating a confidence level that shows confidence in completing the avoidance action for the emergency vehicle.

The determining how to deal with the emergency vehicle includes:
causing the vehicle to take the avoidance action for the emergency vehicle when the detection reliability exceeds a first threshold and the confidence level exceeds a third threshold;
switching operation of the vehicle to the remote or manual driving when the detection reliability exceeds the first threshold and the confidence level is less than the third threshold; and
causing the vehicle to take the preliminary action while the detection reliability is less than the first threshold.

An eleventh disclosure is directed to one or more non-transitory computer readable media encoded with a computer program, the computer program comprising instruction that when executed by one or more processors cause the one or more processors to perform operations for autonomous driving of a vehicle.

The operations comprising:
detecting an emergency vehicle traveling around the vehicle based on surrounding environment information; and
determining how to deal with the emergency vehicle in response to a detection of the emergency vehicle, wherein
the determining how to deal with the emergency vehicle at least includes:
determining to cause the vehicle to take an avoidance action for the emergency vehicle; and
determining to cause the vehicle to take a preliminary action for the avoidance action.

According to the present disclosure, when an emergency vehicle is detected, a vehicle is caused to take an avoidance action for the emergency vehicle or a preliminary action for the avoidance action. In particular, while the detection reliability is not sufficient, the vehicle is caused to take the preliminary action, not the avoidance action. Then when the sufficient detection reliability is obtained, the vehicle is caused to take the avoidance action. Accordingly, if the emergency vehicle was erroneously detected, it is possible to return to the normal autonomous driving without taking the avoidance action. On the other hand, when the sufficient detection reliability is obtained, it is possible that the vehicle smoothly takes the avoidance action because the vehicle has taken the preliminary action in advance. As a result, it is possible to ensure the performance of dealing with the emergency vehicle.

BRIEF DESCRIPTION OF DRAWINGS

FIG. 1 is a table showing how the control device according to the first embodiment determines how to deal with an emergency vehicle in accordance with the detection reliability;

FIG. 5 is a table showing how the control device according to the second embodiment determines how to deal with an emergency vehicle in accordance with the detection reliability;

FIG. 8 is a table showing how the control device according to the third embodiment determines how to deal with an emergency vehicle in accordance with the detection reliability;

EMBODIMENTS

Figure 2:
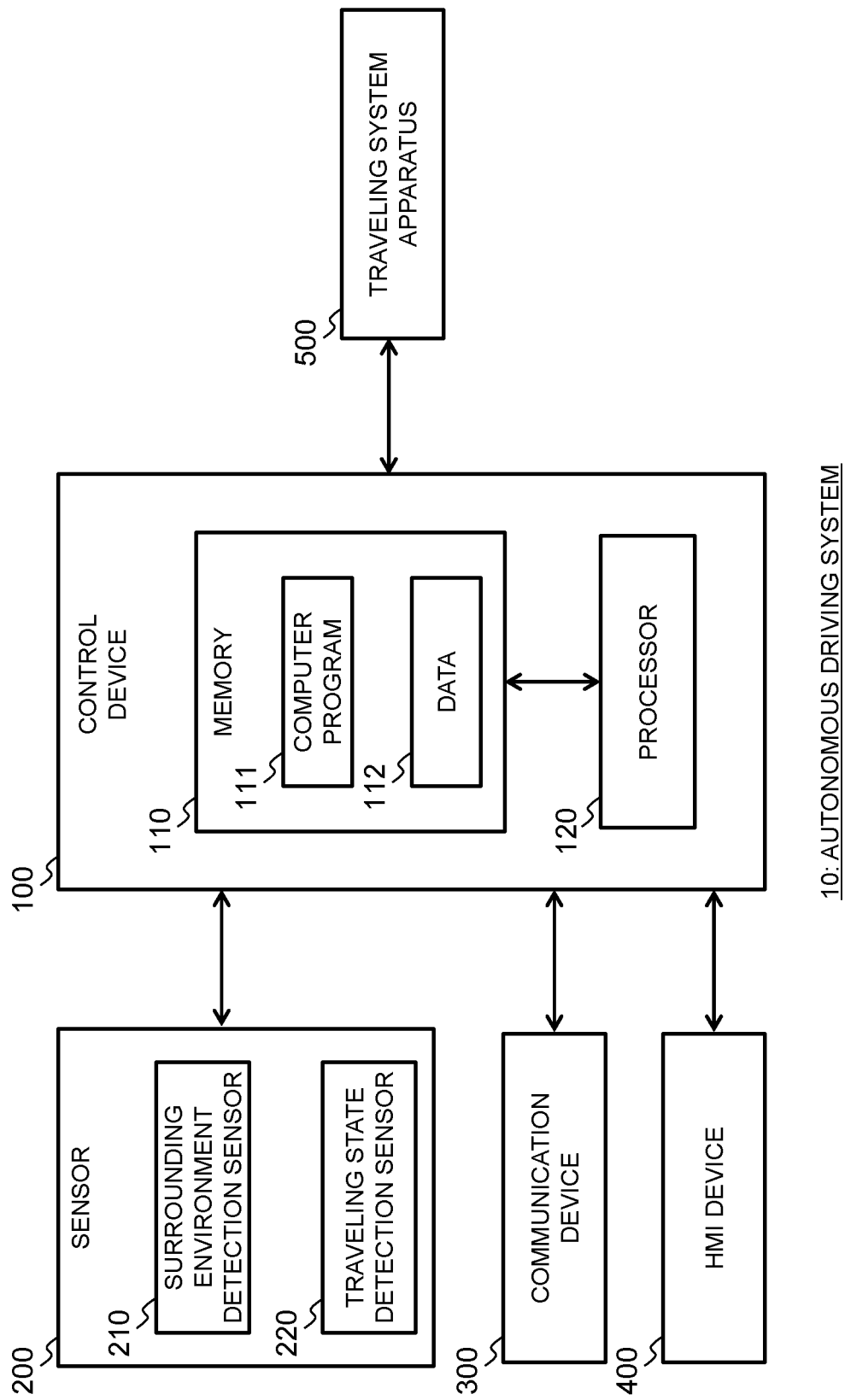
FIG. 2 is a block diagram illustrating a schematic configuration of an autonomous driving system to which a control device according to the first embodiment is applied.

Hereinafter, an embodiment of the present disclosure will be described with reference to the drawings. Note that when the numerals of the numbers, the quantities, the amounts, the ranges and the like of the respective elements are mentioned in the embodiments shown as follows, the present disclosure is not limited to the mentioned numerals unless specially explicitly described otherwise, or unless the present disclosure is explicitly specified by the numerals theoretically. Note that in the respective drawings, the same or corresponding parts are assigned with the same reference signs, and redundant explanations of the parts are properly simplified or omitted.

1. First Embodiment

1-1. Outline

A control device according to the present embodiment is a controller for a vehicle capable of autonomous driving. Therefore, the control device according to the present embodiment can also be referred to as an "autonomous driving controller". In particular, the control device according to the present embodiment has a function of detecting an emergency vehicle traveling around the vehicle and causing the vehicle to take an avoidance action in response to the emergency vehicle. Examples of the emergency vehicle include an ambulance, a fire engine, a patrol car and the like. Typically, the emergency vehicle is emergently traveling with sounding a siren, turning on a warning lamp, or the like. The avoidance action includes an interference determination and an avoidance traveling. The interference determination is to determine whether or not the predicted traveling route of the emergency vehicle interfere with the traveling route of the autonomous driving. When it is predicted in the interference determination that the predicted traveling route of the emergency vehicle interferes with the traveling of the autonomous driving, the avoidance traveling is performed. Examples of the avoidance traveling include deceleration, movement to a standby place (a road shoulder, a roadside zone, or the like where a temporary stop is possible), temporary stop at the standby place and standby for passage of the emergency vehicle, return to a normal traveling route after passage of the emergency vehicle, and the like.

The detection of the emergency vehicle is performed by, for example, acquiring sound information detected by a plurality of microphones included in the vehicle and performing acoustic recognition (detection of siren sound or the like) on the sound information. Since an emergency vehicle typically sounds a loud siren, detection of an emergency vehicle by acoustic recognition has an advantage in terms of a detection range compared to other detection methods Examples of other detection methods include image recognition of image information detected by a camera, point cloud recognition of three-dimensional point cloud information detected by a LiDAR (Light Detection and Ranging) or radar, use of information acquired by communication with infrastructures or surrounding vehicles, and the like.

Here, in the detection of the emergency vehicle, information of the emergency vehicle related to performing the avoidance action is calculated. For example, the information of the emergency vehicle includes the position and direction of the emergency vehicle on the map, the predicted traveling route of the emergency vehicle, and the like.

In a case where the emergency vehicle has not yet traveled sufficiently close to the vehicle, the emergency vehicle may be erroneously detected due to the influence of noise. For this reason, if it is determined to cause the vehicle to take an avoidance action for the emergency vehicle immediately in response to the detection of the emergency vehicle, there is a possibility that the vehicle take the avoidance action unnecessarily. As a result, smooth autonomous driving may be inhibited. On the other hand, if the vehicle does not take the avoidance action until the detection is sufficiently performed, there is a possibility that the performance of dealing with the emergency vehicle cannot be ensured, for example, the dealing with the emergency vehicle cannot be performed in time.

Therefore, the control device according to the present embodiment calculates a detection reliability when an emergency vehicle is detected. Then the control device according to the present embodiment causes the vehicle to take the avoidance action when the detection reliability exceeds a predetermined threshold (first threshold). On the other hand, the control device causes the vehicle to take a preliminary action while the detection reliability is less than the first threshold. FIG. 1 is a table showing how the control device according to the present embodiment determines how to deal with an emergency vehicle in accordance with the detection reliability.

Here, the preliminary action is an action that has little influence on the control or traveling of the autonomous driving and makes the vehicle easier to take the avoidance action.

Examples of the preliminary action related to controls or decisions of traveling include suppressing acceleration/deceleration, prohibiting lane change, generating a traveling route for the avoidance action and determining confidence in completing the avoidance action, searching a traveling route for the avoidance action at an intersection, determining whether to stop temporarily or pass quickly at an intersection, stopping at a position not interfering with the traveling route of the emergency vehicle, requesting information of the emergency vehicle from infrastructures or surrounding vehicles, and the like.

Examples of the preliminary action related to information processing include reducing noise of sensors (for example, reducing the volume of music or voice guidance playing in the vehicle, temporarily adjusting processing with a large volume such as a cooler of devices, or the like), increasing detection sensitivity of sensors, adjusting parameters of sensors, and the like.

As described above, while the detection reliability is not sufficient, the control device according to the present embodiment causes the vehicle to take the preliminary action not the avoidance action. Accordingly, if the emergency vehicle was erroneously detected, it is possible to return to the normal autonomous driving without taking the avoidance action. On the other hand, when the sufficient detection reliability is obtained, it is possible that the vehicle smoothly takes the avoidance action because the vehicle has taken the preliminary action in advance. As a result, it is possible to ensure the performance of dealing with the emergency vehicle.

1-2. Autonomous Driving System

FIG. 2 is a block diagram illustrating a schematic configuration of an autonomous driving system 10 to which the control device 100 according to the present embodiment is applied. The autonomous driving system 10 includes a control device 100, a sensor 200, a communication device 300, an HMI device 400, and a traveling system apparatus 500.

The control device 100 is configured to be able to communicate information with the sensor 200, the communication device 300, the HMI device 400, and the traveling system apparatus 500. Typically, they are electrically connected by wire harnesses. Examples of other configurations include connection by wireless communication, connection by optical communication lines, and the like.

The sensor 200 detects information related to the driving environment of the vehicle and outputs the detected information. The detected information by the sensor 200 is transmitted to the control device 100. The sensor 200 includes a surrounding environment detection sensor 210 that detects surrounding environment information, and a traveling state detection sensor 220 that detects traveling state information.

Examples of the surrounding environment detection sensor 210 include a microphone, a camera, a radar, and a LiDAR. Examples of the surrounding environment information detected by the surrounding environment detection sensor 210 includes sound information, image information, and three-dimensional point cloud information. Examples of the traveling state detection sensor 220 include a wheel speed sensor that detects a vehicle speed, an accelerometer that detects an acceleration/deceleration, and a gyroscope that detects an angular velocity.

The sensor 200 may include other sensors. For example, the sensor 200 may include a sensor that detects an in-vehicle environment (a state of a passenger or the like).

The communication device 300 is a device that transmits/receives information by communicating with external devices of the vehicle. Examples of the communication device 300 include a wireless communication device that communicates with infrastructures or surrounding vehicles, a GPS receiver, and a device for communicating with a server on the Internet, and the like. The communication information received by the communication device 300 is transmitted to the control device 100. Examples of the communication information transmitted to the control device 100 include map information, traffic reports, position information by GPS, traveling information of surrounding vehicles, and the like.

The HMI device 400 is a device that provides HMI functions. Examples of the HMI device 400 include a display, a speaker, a touch panel, a switch, an indicator, and the like. The HMI device 400 realizes an operation by the operator such as setting related to the autonomous driving, a notification of a control state related to the autonomous driving to the operator, and the like. For example, the HMI device 400 realizes setting of a destination, ON/OFF of each function, display of a surrounding map, a request for switching to manual driving, and the like.

The control device 100 is a computer that executes processing related to the autonomous driving and outputs a control signal based on acquired information. The control device 100 is typically realized by one or more ECUs (Electronic Control Units) provided in the vehicle. Alternatively, the control device 100 may be realized by a server configured on a communication network (typically, the Internet). In this case, the control device 100 acquires information and transmits a control signal by communication via the communication network.

The control device 100 includes one or more memories 110 and one or more processors 120. The one or more memories 110 store a computer program 111 executable by the one or more processors 120, and data 112 necessary for processing executed by the one or more processors 120. Here, each of the one or more memories 110 may be a non-transitory computer readable media encoded with the computer program 111. Examples of the one or more memories 110 include a volatile memory, a non-volatile memory, an HDD, an SSD, and the like. The information acquired by the control device 100 is stored in the one or more memories 110 as data 112. The data 112 is, for example, the detected information by the sensor 200, setting information, map information, traffic reports, parameter information related to the computer program 111, and the like.

The one or more processors 120 read the computer program 111 and the data 112 from the one or more memories 110, and execute processing according to the computer program 111 based on the data 112. The computer program 111 is configured to comprise instructions that when executed by the one or more processors 120 cause the one or more processors to perform operations for the autonomous driving of the vehicle. As a result, the processing related to the autonomous driving is executed by the one or more processors 120, and the control signal is generated.

Examples of the processing related to the autonomous driving include a localization processing, a recognition processing for surrounding environment, an action plan generation processing, and a traveling route generation processing.

In the recognition processing, recognition of road surface markings, recognition of pedestrians and prediction of moving routes of the pedestrians, recognition of surrounding vehicles and prediction of traveling routes of the surrounding vehicles, recognition of traffic signs, recognition of surrounding obstacles, and the like are performed. In the action plan generation processing, an action plan based on the results of the localization processing and the recognition processing is generated. The action plan includes, for example, determination of a target vehicle speed, performing a right or left turn, performing a lane change, performing passing other vehicles, and the like. In the traveling route generation processing, a traveling route is generated in accordance with the action plan generated in the action plan generation processing.

Then, the one or more processors 120 generate a control signal in accordance with the generated action plan and the generated traveling route. For example, control signals related to acceleration, braking, and steering are generated so as to follow the traveling route. The control signal is transmitted to the traveling system apparatus 500.

According to the present embodiment, the one or more processors 120 are configured to execute a processing (emergency vehicle detection processing) of detecting an emergency vehicle traveling around the vehicle, a processing (detection reliability calculation processing) of calculating a detection reliability, and a processing (countermeasure determination processing) of determining how to deal with the emergency vehicle in response to a detection of the emergency vehicle. These processing will be described later.

The traveling system apparatus 500 is an apparatus that controls the traveling of the vehicle. When the traveling system apparatus 500 controls the traveling of the vehicle in accordance with the control signal acquired from the control device 100, the autonomous driving of the vehicle is realized.

The traveling system apparatus 500 includes, for example, a group of actuators provided in the vehicle and one or more ECUs that controls the group of actuators. Examples of the group of actuators provided in the vehicle include an actuator that drives a motor, an actuator that drives a brake system, an actuator that drives a steering system, and the like.

1-3. Processing Configuration

Figure 3:
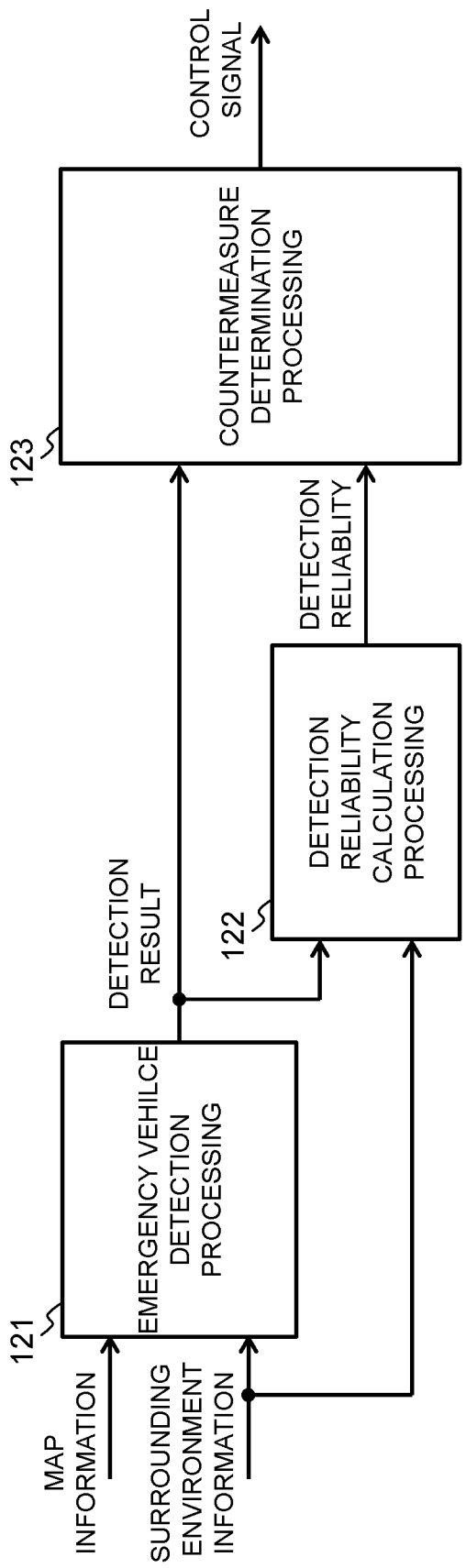
FIG. 3 is a block diagram for explaining a process for dealing with an emergency vehicle in the first embodiment.

FIG. 3 is a block diagram illustrating a configuration of processing executed by the one or more processors 120.

First, in the emergency vehicle detection processing 121, the one or more processors 120 execute detecting an emergency vehicle traveling around the vehicle based on the surrounding environment information. Examples of the method for detecting include acoustic recognition of sound information detected by a microphone (detection of a loud sound, detection of a siren sound by a machine learning model, and the like), image recognition of image information detected by a camera (recognition and classification of an emergency vehicle, recognition of a warning lamp, and the like), point cloud recognition of three-dimensional point cloud information detected by a LiDAR or radar (recognition and classification of an emergency vehicle), and the like.

The one or more processors 120 calculate a detection result as a result of the emergency vehicle detection processing 121. Here, when an emergency vehicle is detected, the detection result may include information of the emergency vehicle that can be detected and estimated. For example, the detection result may include area information on a map where the emergency vehicle is present, a predicted traveling route of the emergency vehicle, and the like. The one or more processors 120 use the map information to calculate such information of the emergency vehicle. Examples of the method for calculating the information of the emergency vehicle include calculating a relative distance between the vehicle and the emergency vehicle and a direction of the emergency vehicle by acoustic recognition of sound information detected by a plurality of microphones (for example, recognition processing based on a difference in detection time between the microphones or a ratio of sound volumes), and calculating a position and a direction of the emergency vehicle on a map using the map information.

The one or more processors 120 may further use the communication information acquired from the communication device 300 when calculating the information of the emergency vehicle. For example, when an emergency vehicle is detected, the one or more processors 120 may acquire and use presence information of the emergency vehicle in a specific area or information of a real time location system through communication with infrastructures. Alternatively, the one or more processors 120 may acquire and use a detection result of the emergency vehicle that surrounding vehicles have through communication with the surrounding vehicles.

Next, in the detection reliability calculation processing 122, the one or more processors 120 calculate the detection reliability when the emergency vehicle is detected. The detection of the emergency vehicle is determined from the detection result calculated in the emergency vehicle detection processing 121. The one or more processors 120 can calculate the detection reliability based on the feature of the information of the emergency vehicle included in the detection result. Here, the feature of the information of the emergency vehicle is, for example, a detection frequency of a siren sound in acoustic recognition, an amount of change in acoustic direction of the siren sound, a frequency of change in acoustic direction of the siren sound, a state of change (randomness) in acoustic direction of the siren sound, a volume of the siren sound, vehicle recognition performance (detection frequency), and the like. The one or more processors 120 may consider plural features when calculating the detection reliability.

For example, assuming that the feature of the information of the emergency vehicle is Si (i=1, 2, . . . , N), the one or more processors 120 may calculate the detection reliability as "Confidence" of the following Formula 1.

$$\text{Confidence}(S_1, S_2, \ldots, S_N) = w_1 * n_1 * S_1 + w_2 * n_2 * S_2 + \ldots + w_{N-2} * n_{N-2} * S_{N-2} + w_{N-1} * n_{N-1} * S_{N-1} + w_N * n_N * S_N \quad \text{[Formula 1]}$$

Where, wi (i=1, 2, . . . , N) is a weight of each information. The weight wi indicates the degree of influence of each information on the detection reliability. For example, the weight wi is given based on a recognition rate of a siren sound, a recognition accuracy or a classification accuracy (recall rate, conformity rate) of the emergency vehicle in the acoustic recognition. Furthermore, the weight wi for information predicted to have low detection reliability in advance (such as vehicle detection based on image information or three-dimensional point cloud information) may be given such that the detection reliability does not increase unless there is one or more pieces of information predicted to have high detection reliability (such as sound recognition above the 10SNR and detection result acquired from infrastructures or surrounding vehicles).

ni (I=1, 2, . . . , N) is a correction value by noise prediction. The correction value ni indicates a degree of influence of peripheral noise or the like with respect to each information. For example, the correction value ni is given based on the noise level, the characteristics of the noise (such as whether the same frequency as the detected siren sound is detected), the SNR, the degree of shielding by surrounding buildings, other sensor information, information outside the vehicle, and the like. Further, the possibility of erroneous detection may be corrected based on noise prediction, and the correction value ni may be given so as to lower the detection reliability even in the case of information in which the detection reliability is expected to be high under a condition weak to noise.

Next, in the countermeasure determination processing 123, when an emergency vehicle is detected, the one or more processors 120 execute determining how to deal with the emergency vehicle base on the detection reliability calculated in the detection reliability calculation processing 122. The detection of the emergency vehicle is determined from the detection result calculated in the emergency vehicle detection processing 121. When the detection reliability exceeds the first threshold, the one or more processors 120 execute causing the vehicle to take the avoidance action. And, while the detection reliability is less than the first threshold, the one or more processors 120 execute causing the vehicle to take the preliminary action. Here, the first threshold may be suitably determined according to an environment in which the autonomous driving system 10 is applied, and may be given in advance as the computer program 111 or the data 112.

The one or more processors 120 generate a control signal for causing the vehicle to take the avoidance action or the preliminary action as a result of the countermeasure determination processing 123. For example, the one or more processors 120 may generate an action plan corresponding to the avoidance action or the preliminary action, and generate a control signal according to the action plan. Thus, the autonomous driving system 10 realizes that the vehicle takes the avoidance action or the preliminary action for the emergency vehicle in accordance with the detection reliability.

1-4. Control Method

Figure 4:
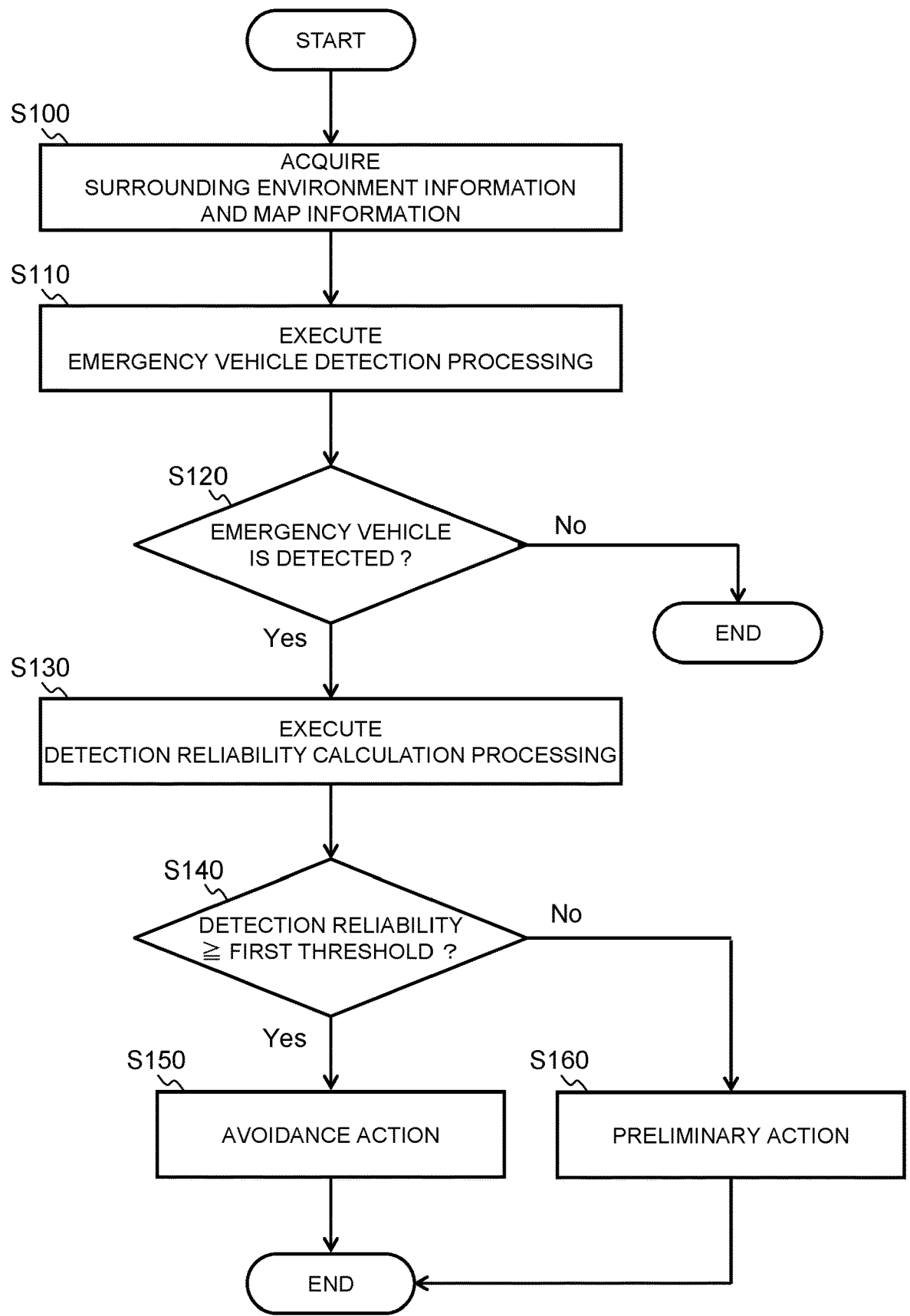
FIG. 4 is a flowchart showing a control method realized by the autonomous driving system according to the first embodiment.
Figure 6:
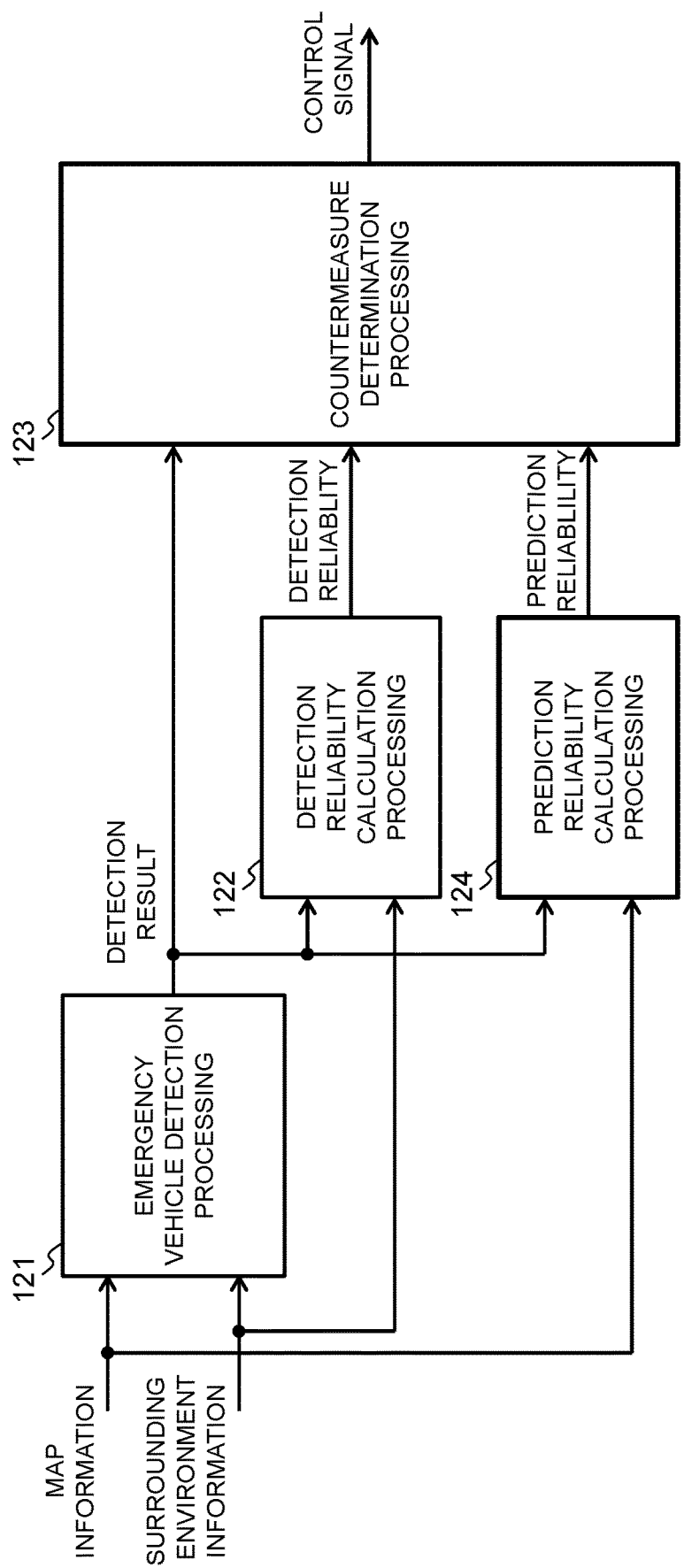
FIG. 6 is a block diagram for explaining a process for dealing with an emergency vehicle in the second embodiment.

Hereinafter, a control method realized by the autonomous driving system 10 according to the present embodiment will be described. FIG. 4 is a flowchart showing the control method realized by the autonomous driving system 10 according to the present embodiment. The process shown in FIG. 4 may be repeatedly executed at predetermined intervals.

First, the surrounding environment information and the map information are acquired (Step S100), and the emergency vehicle detection processing 121 is executed (Step S110). When the emergency vehicle is not detected (Step S120; No), the process at the time of this execution ends.

When the emergency vehicle is detected (Step S120; Yes), the detection reliability calculation processing 122 is executed (Step S130) to calculate the detection reliability. When the detection reliability exceeds the first threshold (Step S140; Yes), the vehicle is caused to take the avoidance action (Step S150). While the detection reliability is less than the first threshold (Step S140; No), the vehicle is caused to take the preliminary action (Step S160).

1-5. Effects

As described above, according to the present embodiment, the detection reliability is calculated when an emergency vehicle is detected. When the detection reliability exceeds the first threshold, the vehicle is caused to take the avoidance action. And, while the detection reliability is less than the first threshold, the vehicle is caused to take the preliminary action. Accordingly, if the emergency vehicle was erroneously detected, it is possible to return to the normal autonomous driving without taking the avoidance action. On the other hand, when the sufficient detection reliability is obtained, it is possible that the vehicle smoothly takes the avoidance action because the vehicle has taken the preliminary action in advance. As a result, it is possible to ensure the performance of dealing with the emergency vehicle.

2. Second Embodiment

Hereinafter, a second embodiment will be described. In the following description, description overlapping with the above-described content will be appropriately omitted.

The control device 100 according to the second embodiment is configured to further execute, when the emergency vehicle is detected, a processing (prediction reliability calculation processing) of calculating a prediction reliability that shows a reliability of a predicted traveling route of the emergency vehicle. The prediction reliability may be considered to show a possibility that the emergency vehicle travels along the predicted traveling route.

The control device 100 according to the second embodiment is configured to execute causing the vehicle to take the avoidance action for the emergency vehicle when the detection reliability exceeds the first threshold and the prediction reliability exceeds a second threshold. And the control device 100 according to the second embodiment is configured to execute causing the vehicle to take the preliminary action for the avoidance action while the detection reliability is less than the first threshold or the prediction reliability is less than the second threshold. FIG. 5 is a table showing how the control device 100 according to the second embodiment determines how to deal with an emergency vehicle in accordance with the detection reliability and the prediction reliability. As shown in FIG. 5, according to the second embodiment, even when the detection reliability exceeds the first threshold, the vehicle is caused to take the preliminary action while the prediction reliability is less than the second threshold.

According to the second embodiment, it is possible to suppress that the avoidance action based on the predicted traveling route of the emergency vehicle is hindered in a case where the emergency vehicle does not travel along the predicted traveling route after causing the vehicle to take the avoidance action.

The configuration of the autonomous driving system 10 according to the second embodiment may be the same as the configuration of the autonomous driving system 10 according to the first embodiment described in FIG. 2. FIG. 3 is a block diagram illustrating a configuration of processing executed by the one or more processors 120 in the second embodiment. In the second embodiment, the one or more processors 120 are configured to execute the emergency vehicle detection processing 121, the detection reliability calculation processing 122, the countermeasure determination processing 123, and the prediction reliability calculation processing 124 as processes related to dealing with an emergency vehicle. Here, the emergency vehicle detection processing 121 and the detection reliability calculation processing 122 may be equivalent to the processing described in FIG. 3.

In the prediction reliability calculation processing 124, when an emergency vehicle is detected, the one or more processors 120 calculate the prediction reliability for the predicted traveling route of the emergency vehicle. The predicted traveling route of the emergency vehicle may be calculated in the emergency vehicle detection processing 121 and outputted as the detection result. The prediction reliability is calculated based on the map information and the surrounding environment information. For example, the prediction reliability can be calculated so that the higher a value obtained by multiplying the number of traveling routes on which the emergency vehicle can travel, the number of traffic signals from the position of the emergency vehicle to the host vehicle, and the number of road branches, the smaller the value of the prediction reliability.

Next, in the countermeasure determination processing 123, when an emergency vehicle is detected, the one or more processors 120 execute determining how to deal with the emergency vehicle based on the detection reliability and the prediction reliability calculated in the detection reliability calculation processing 122 and the prediction reliability calculation processing 124. When the detection reliability exceeds the first threshold and the prediction reliability exceeds the second threshold, the one or more processors 120 execute causing the vehicle to take the avoidance action. And, while the detection reliability is less than the first threshold or the prediction reliability is less than the second threshold, the one or more processors 120 execute causing the vehicle to take the preliminary action. Here, the first threshold and the second threshold may be suitably determined according to an environment in which the autonomous driving system 10 is applied, and may be given in advance as the computer program 111 or the data 112.

The one or more processors 120 generate a control signal for causing the vehicle to take the avoidance action or the preliminary action as a result of the countermeasure determination processing 123. Thus, the autonomous driving system 10 realizes that the vehicle takes the avoidance action or the preliminary action for the emergency vehicle in accordance with the detection reliability and the prediction reliability.

Figure 7:
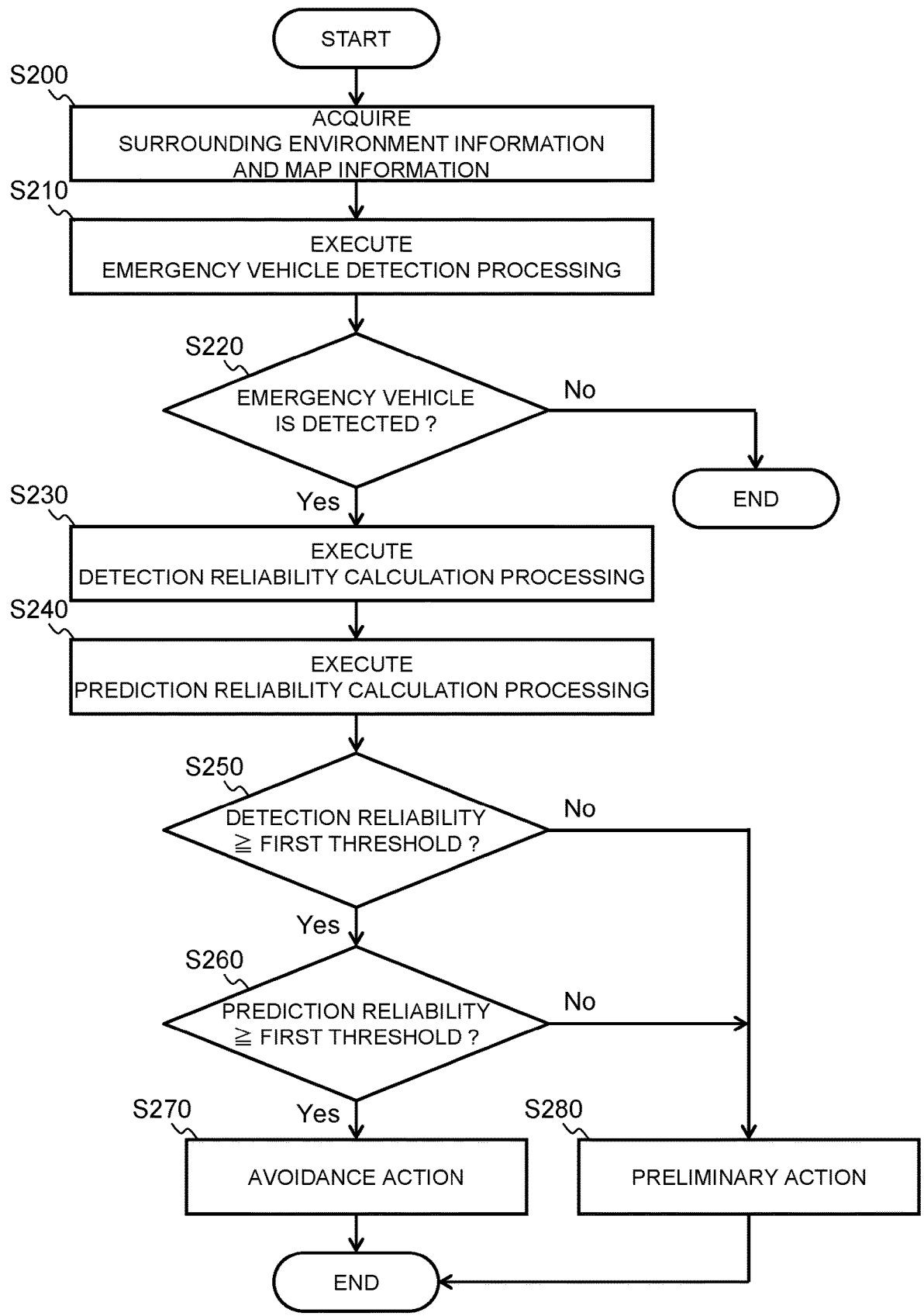
FIG. 7 is a flowchart showing a control method realized by the autonomous driving system according to the second embodiment.

Hereinafter, a control method realized by the autonomous driving system 10 according to the second embodiment will be described. FIG. 7 is a flowchart showing the control method realized by the autonomous driving system 10 according to the second embodiment. The process shown in FIG. 7 may be repeatedly executed at predetermined intervals.

First, the surrounding environment information and the map information are acquired (Step S200), and the emergency vehicle detection processing 121 is executed (Step S210). When the emergency vehicle is not detected (Step S220; No), the process at the time of this execution ends.

When the emergency vehicle is detected (Step S220; Yes), the detection reliability calculation processing 122 and the prediction reliability calculation processing 124 are executed (Step S230 and Step S240) to calculate the detection reliability and the prediction reliability. When the detection reliability exceeds the first threshold (Step S250; Yes) and the prediction reliability exceeds the second threshold (Step S260; Yes), the vehicle is caused to take the avoidance action (Step S270). While the detection reliability is less than the first threshold (Step S250; No) or the prediction reliability is less than the second threshold (Step S260; No), the vehicle is caused to take the preliminary action (Step S280).

3. Third Embodiment

Hereinafter, a third embodiment will be described. In the following description, description overlapping with the above-described content will be appropriately omitted.

The control device 100 according to the third embodiment is configured to further execute, when the emergency vehicle is detected, a processing (confidence level calculation processing) of calculating a confidence level that shows confidence in completing the avoidance action for the emergency vehicle. The confidence level may be considered to show a possibility in completing the avoidance traveling.

The control device 100 according to the third embodiment is configured to execute causing the vehicle to take the avoidance action for the emergency vehicle when the detection reliability exceeds the first threshold and the confidence level exceeds a third threshold. And the control device 100 according to the third embodiment is configured to execute switching operation of the vehicle to remote or manual driving when the detection reliability exceeds the first threshold and the confidence level is less than the third threshold. Further, the control device 100 according to the third embodiment is configured to execute causing the vehicle to take a specific preliminary action included in the preliminary action while the detection reliability is less than the first threshold and the confidence level exceeds the third threshold. And the control device 100 according to the third embodiment is configured to execute causing the vehicle to take the preliminary action not limited to the specific preliminary action while the detection reliability is less than the first threshold and the confidence level is less than the third threshold. Furthermore, while the detection reliability is less than the first threshold and the confidence level is less than the third threshold, the control device 100 may be configured to execute issuing an alert notifying that there is anticipation of switching operation of the vehicle to remote or manual driving. The specific preliminary action is the preliminary action related to determination of traveling or traveling control. Examples of the specific preliminary action include a deceleration control, acquiring information of the detected emergency vehicle from infrastructures or surrounding vehicles, and the like. FIG. 8 is a table showing how the control device 100 according to the third embodiment determines how to deal with an emergency vehicle in accordance with the detection reliability and the confidence level.

According to the third embodiment, when the confidence level is low, that is it is difficult to deal with the emergency vehicle by autonomous driving, it is possible to switch operation of the vehicle to remote or manual driving. Furthermore, by issuing the alarm notifying that there is anticipation of switching operation of the vehicle to remote or manual driving while the detection reliability is low and the confidence level is low, it is possible to realize smooth switching operation of the vehicle to remote or manual driving. In addition, while the detection reliability is high and the confidence level is high, the vehicle is caused to take the specific preliminary action. It is thus possible to prevent that the vehicle takes the preliminary action unnecessarily. Consequently, it is possible to prevent smooth autonomous driving from being inhibited.

The configuration of the autonomous driving system 10 according to the third embodiment may be the same as the configuration of the autonomous driving system 10 according to the first embodiment described in FIG. 2. However, the vehicle is configured to be able to be operated by remote or manual driving. For example, so as to be able to be operated by remote driving, the vehicle is configured to be able to communicate with a remote driving center in charge of remote driving by the communication device 300, and the traveling system apparatus 500 is configured to perform traveling control in accordance with driving operation acquired from the remote driving center. Alternatively, so as to be able to be operated by manual driving, the vehicle is provided with driving operation devices (an accelerator pedal, a steering wheel, and the like).

Figure 9:
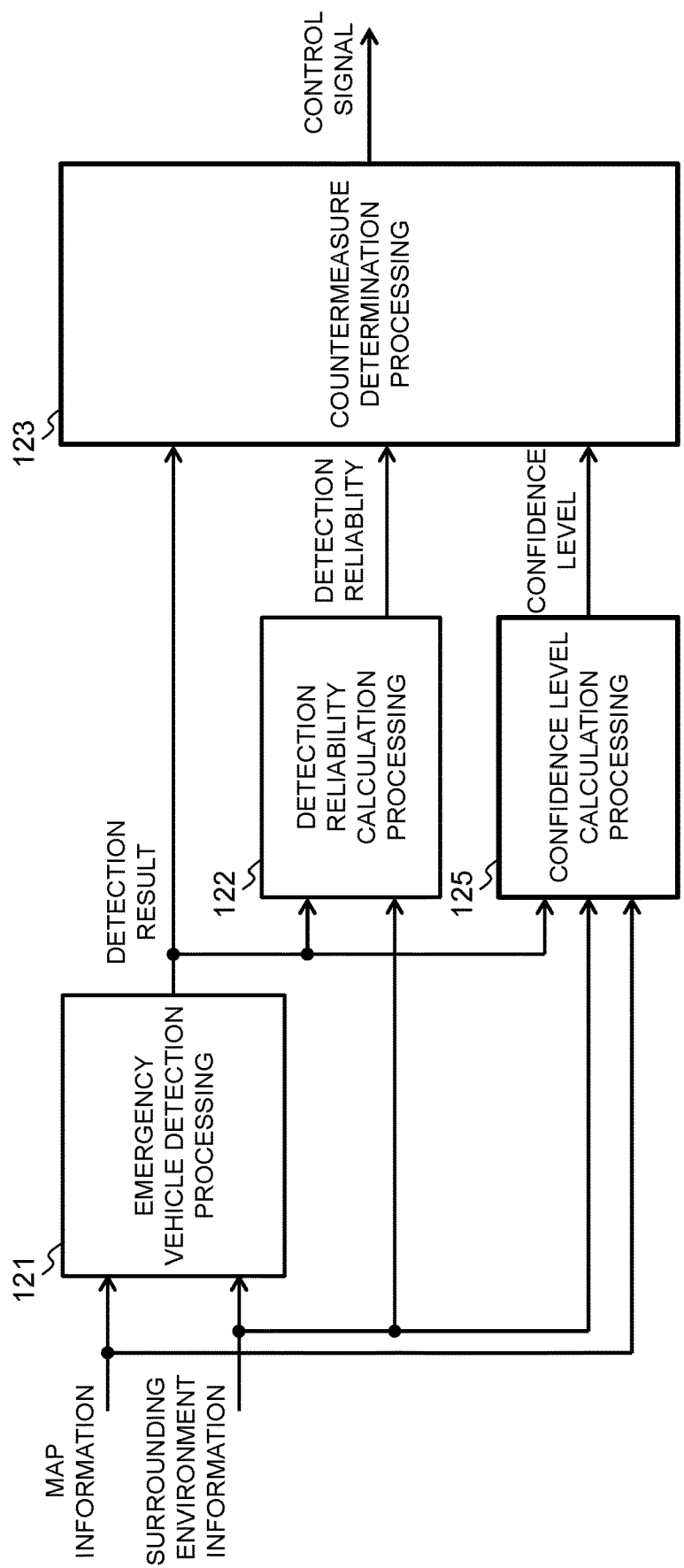
FIG. 9 is a block diagram for explaining a process for dealing with an emergency vehicle in the third embodiment.

FIG. 9 is a block diagram illustrating a configuration of processing executed by the one or more processors 120 in the third embodiment. In the third embodiment, the one or more processors 120 are configured to execute the emergency vehicle detection processing 121, the detection reliability calculation processing 122, the countermeasure determination processing 123, and the confidence level calculation processing 125 as processes related to dealing with an emergency vehicle. Here, the emergency vehicle detection processing 121 and the detection reliability calculation processing 122 may be equivalent to the processing described in FIG. 3.

In the confidence level calculation processing 125, the one or more processors 120 calculate the confidence level when an emergency vehicle is detected. The confidence level is calculated based on the map information, the surrounding environment information, or the detection result. For example, the confidence level is calculated to be low when it is detected that the road is narrow, or the surrounding vehicles or pedestrians are crowded.

Next, in the countermeasure determination processing 123, when an emergency vehicle is detected, the one or more processors 120 execute determining how to deal with the emergency vehicle based on the detection reliability and the confidence level calculated in the detection reliability calculation processing 122 and the confidence level calculation processing 125. When the detection reliability exceeds the first threshold and the confidence level exceeds the third threshold, the one or more processors 120 execute causing the vehicle to take the avoidance action. And, when the detection reliability exceeds the first threshold and the confidence level is less than the third threshold, the one or more processors 120 execute switching operation of the vehicle to remote or manual driving. And, while the detection reliability is less than the first threshold, the one or more processors 120 execute causing the vehicle to take the preliminary action. Here, while the detection reliability is less than the first threshold and the confidence level exceeds the third threshold, the one or more processors 120 execute causing the vehicle to take the specific preliminary action. And, while the detection reliability is less than the first threshold and the confidence level is less than the third threshold, the one or more processors 120 execute causing the vehicle to take the preliminary action not limited to the specific action. Furthermore, while the detection reliability is less than the first threshold and the confidence level is less than the third threshold, the one or more processors 120 execute issuing the alert notifying that there is anticipation of switching operation of the vehicle to remote or manual driving. Here, the first threshold and the third threshold may be suitably determined according to an environment in which the autonomous driving system 10 is applied, and may be given in advance as the computer program 111 or the data 112.

The one or more processors 120 generate a control signal for causing the vehicle to take the avoidance action or the preliminary action as a result of the countermeasure determination processing 123. Thus, the autonomous driving system 10 realizes that the vehicle takes the avoidance action or the preliminary action for the emergency vehicle in accordance with the detection reliability and the confidence level.

Figure 10:
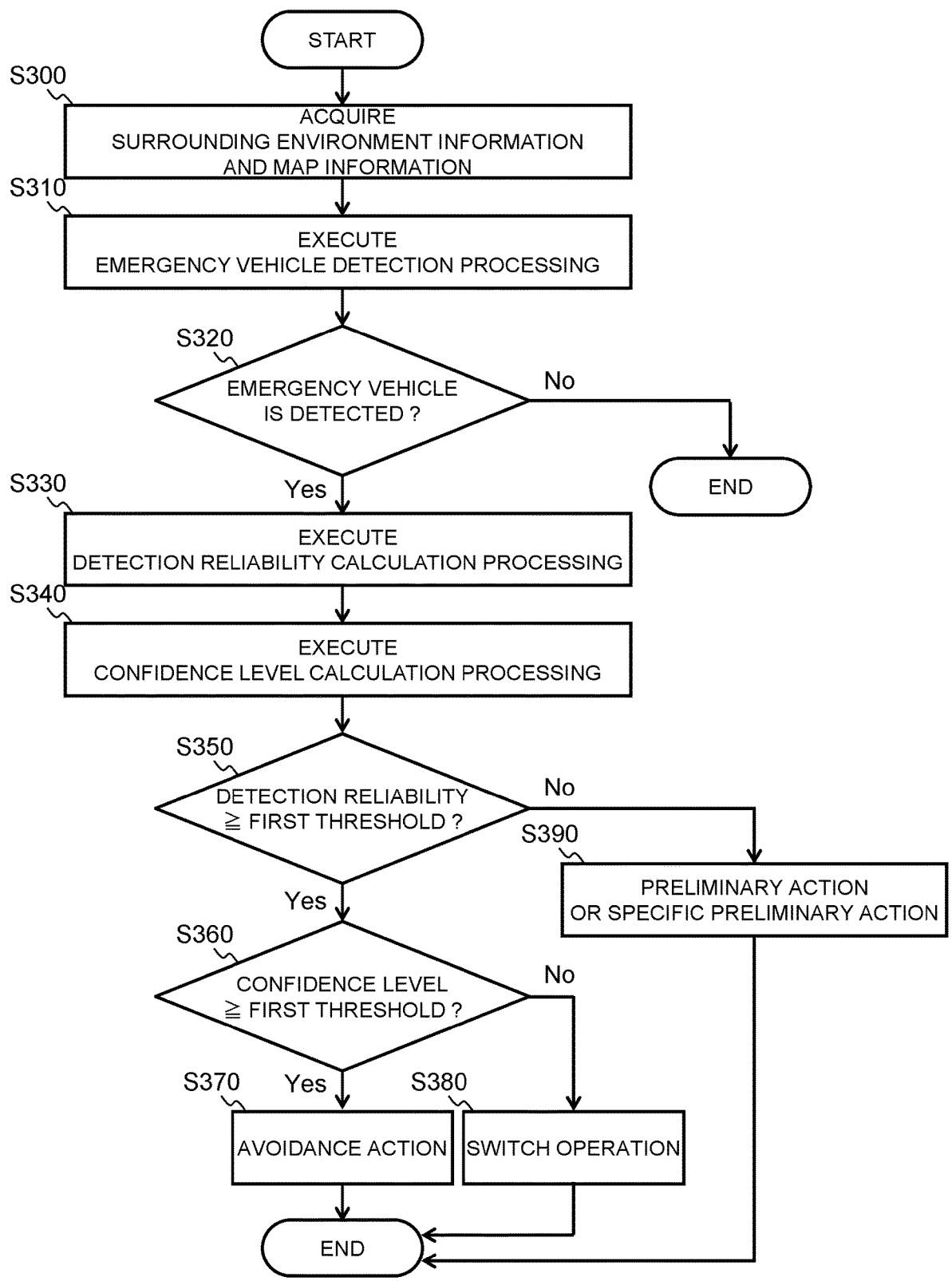
FIG. 10 is a flowchart showing a control method realized by the autonomous driving system according to the third embodiment.

Hereinafter, a control method realized by the autonomous driving system 10 according to the third embodiment will be described. FIG. 10 is a flowchart showing the control method realized by the autonomous driving system 10 according to the third embodiment. The process shown in FIG. 10 may be repeatedly executed at predetermined intervals.

First, the surrounding environment information and the map information are acquired (Step S300), and the emergency vehicle detection processing 121 is executed (Step S310). When the emergency vehicle is not detected (Step S320; No), the process at the time of this execution ends.

When the emergency vehicle is detected (Step S320; Yes), the detection reliability calculation processing 122 and the confidence level calculation processing 125 are executed (Step S330 and Step S340) to calculate the detection reliability and the confidence level.

When the detection reliability exceeds the first threshold (Step S350; Yes) and the confidence level exceeds the third threshold (Step S360; Yes), the vehicle is caused to take the avoidance action (Step S370). When the detection reliability exceeds the first threshold (Step S350; Yes) and the confidence level is less than the third threshold (Step S360; No), operation of the vehicle is switched to remote or manual driving is performed (Step S380). While the detection reliability is less than the first threshold (Step S350; No), the vehicle is caused to take the specific preliminary action or the preliminary action not limited to the specific preliminary action in according with the confidence level (Step S390). Here, in Step S390, when the confidence level exceeds the third reference value, the vehicle is caused to take the specific preliminary action. On the other hand, when the confidence level is less than the third threshold, the vehicle is caused to take the preliminary action not limited to the specific preliminary action. In particular, when the confidence level is less than the third threshold, issuing the alert notifying that there is anticipation of switching operation of the vehicle to remote or manual driving is performed.

What is claimed is:

1. A controller for a vehicle configured to autonomously drive, the controller being configured to execute:

detecting an emergency vehicle traveling around the vehicle based on surrounding environment information; and determining how to deal with the emergency vehicle in response to a detection of the emergency vehicle, wherein the determining how to deal with the emergency vehicle at least includes:

causing the vehicle to take an avoidance action for the emergency vehicle;

causing the vehicle to take a preliminary action for the avoidance action, the preliminary action including reducing a volume of voice guidance playing in the vehicle;

generating a control signal that causes the vehicle to take the avoidance action or the preliminary action and generating a travel route in accordance with an action plan, and controlling the vehicle to autonomously travel in accordance with the generated control signal and along the generated travel route in accordance with the action plan;

calculating a detection reliability that shows a reliability of detection of the emergency vehicle, and the determining how to deal with the emergency vehicle includes:

causing the vehicle to take the avoidance action for the emergency vehicle when the detection reliability exceeds a first threshold, the first threshold is determined according to an environment in which the autonomous driving is applied and is given in advance; and causing the vehicle to take the preliminary action while the detection reliability is less than the first threshold;

wherein calculating the detection reliability is based on a feature of information of the emergency vehicle included in a detection result, and includes a detection frequency of a siren sound in acoustic recognition, an amount of change in an acoustic direction of the siren sound, a frequency of change in the acoustic direction of the siren sound, a state of change in the acoustic direction of the siren sound including a degree of randomness, a volume of the siren sound, and vehicle recognition performance, wherein the detection reliability is calculated using the following formula:

$$\text{Confidence}(S_1, S_2, \ldots, S_N) = w_1 * n_1 * S_1 + w_2 * n_2 * S_2 + \ldots + w_{N-2} * n_{N-2} * S_{N-2} + w_{N-1} * n_{N-1} * S_{N-1} + w_N * n_N * S_N, \text{ and}$$

wherein a weight is given based on a recognition rate of the siren sound, a recognition accuracy, or a classification accuracy of the emergency vehicle in the acoustic recognition, and n is a correction value by noise prediction and is given based on a noise level, a signal-to-noise ratio. and a degree of shielding by surrounding buildings.

2. The controller according to claim 1, wherein the controller is further configured to execute:

calculating a prediction reliability that shows a reliability of a predicted traveling route of the emergency vehicle, and the determining how to deal with the emergency vehicle includes:

causing the vehicle to take the avoidance action for the emergency vehicle when the detection reliability exceeds the first threshold and the prediction reliability exceeds a second threshold; and causing the vehicle to take the preliminary action while the detection reliability is less than the first threshold or the prediction reliability is less than the second threshold.

3. The controller according to claim 1, wherein the vehicle is configured to be able to be operated by remote or manual driving, the controller is further configured to execute:

calculating a confidence level that shows confidence in completing the avoidance action for the emergency vehicle, and the determining how to deal with the emergency vehicle includes:

causing the vehicle to take the avoidance action for the emergency vehicle when the detection reliability exceeds the first threshold and the confidence level exceeds a third threshold;

switching operation of the vehicle to the remote or the manual driving when the detection reliability exceeds the first threshold and the confidence level is less than the third threshold; and causing the vehicle to take the preliminary action while the detection reliability is less than the first threshold.

4. The controller according to claim 3, wherein
the preliminary action includes a specific preliminary action, and the determining how to deal with the emergency vehicle includes causing the vehicle to take the specific preliminary action while the detection reliability is less than the first threshold and the confidence level exceeds the third threshold.

5. The controller according to claim 3, wherein
the determining how to deal with the emergency vehicle includes issuing an alert notifying that there is anticipation of switching operation of the vehicle to the remote or the manual driving while the detection reliability is less than the first threshold and the confidence level is less than the third threshold.

6. A control method for a vehicle configured to autonomously drive, the control method including:

detecting an emergency vehicle traveling around the vehicle based on surrounding environment information; and determining how to deal with the emergency vehicle in response to a detection of the emergency vehicle, wherein the determining how to deal with the emergency vehicle at least includes:

causing the vehicle to take an avoidance action for the emergency vehicle;

causing the vehicle to take a preliminary action for the avoidance action, the preliminary action including reducing a volume of voice guidance playing in the vehicle;

generating a control signal that causes the vehicle to take the avoidance action or the preliminary action and generating a travel route in accordance with an action plan, and controlling the vehicle to autonomously travel in accordance with the generated control signal and along the generated travel route in accordance with the action plan;

calculating a detection reliability that shows a reliability of detection of the emergency vehicle, and the determining how to deal with the emergency vehicle includes:

causing the vehicle to take the avoidance action for the emergency vehicle when the detection reliability exceeds a first threshold, the first threshold is determined according to an environment in which the autonomous driving is applied and is given in advance; and causing the vehicle to take the preliminary action while the detection reliability is less than the first threshold;

wherein calculating the detection reliability is based on a feature of information of the emergency vehicle included in a detection result, and includes a detection frequency of a siren sound in acoustic recognition, an amount of change in an acoustic direction of the siren sound, a frequency of change in the acoustic direction of the siren sound, a state of change in the acoustic direction of the siren sound including a degree of randomness, a volume of the siren sound, and vehicle recognition performance, wherein the detection reliability is calculated using the following formula:

$$\text{Confidence}(S_1, S_2, \ldots, S_N) = w_1 * n_1 * S_1 + w_2 * n_2 * S_2 + \ldots + w_{N-2} * n_{N-2} * S_{N-2} + w_{N-1} * n_{N-1} * S_{N-1} + w_N * n_N * S_N, \text{ and}$$

wherein a weight is given based on a recognition rate of the siren sound, a recognition accuracy, or a classification accuracy of the emergency vehicle in the acoustic recognition, and n is a correction value by noise prediction and is given based on a noise level, a signal-to-noise ratio, and a degree of shielding by surrounding buildings.

7. The control method according to claim 6, wherein the control method further includes:
calculating a prediction reliability that shows a reliability of a predicted trajectory of the emergency vehicle, and
the determining how to deal with the emergency vehicle includes:
causing the vehicle to take the avoidance action for the emergency vehicle when the detection reliability exceeds the first threshold and the prediction reliability exceeds a second threshold; and
causing the vehicle to take the preliminary action while the detection reliability is less than the first threshold or the prediction reliability is less than the second threshold.

8. The control method according to claim 6, wherein the vehicle is configured to be able to be operated by remote or manual driving,
the control method further includes:
calculating a confidence level that shows confidence in completing the avoidance action for the emergency vehicle, and
the determining how to deal with the emergency vehicle includes:
causing the vehicle to take the avoidance action for the emergency vehicle when the detection reliability exceeds the first threshold and the confidence level exceeds a third threshold;
switching operation of the vehicle to the remote or the manual driving when the detection reliability exceeds the first threshold and the confidence level is less than the third threshold; and
causing the vehicle to take the preliminary action while the detection reliability is less than the first threshold.

9. One or more non-transitory computer readable media encoded with a computer program, the computer program comprising instructions that when executed by one or more processors cause the one or more processors to perform operations for autonomous driving of a vehicle, the operations comprising:
detecting an emergency vehicle traveling around the vehicle based on surrounding environment information; and
determining how to deal with the emergency vehicle in response to a detection of the emergency vehicle, wherein the determining how to deal with the emergency vehicle at least includes:
causing the vehicle to take an avoidance action for the emergency vehicle;
causing the vehicle to take a preliminary action for the avoidance action, the preliminary action including reducing a volume of voice guidance playing in the vehicle;
generating a control signal that causes the vehicle to take the avoidance action or the preliminary action and generating a travel route in accordance with an action plan, and controlling the vehicle to autonomously travel in accordance with the generated control signal and along the generated travel route in accordance with the action plan,
calculating a detection reliability that shows a reliability of detection of the emergency vehicle, and the determining how to deal with the emergency vehicle includes:
causing the vehicle to take the avoidance action for the emergency vehicle when the detection reliability exceeds a first threshold, the first threshold is determined according to an environment in which the autonomous driving is applied and is given in advance; and
causing the vehicle to take the preliminary action while the detection reliability is less than the first threshold;
wherein calculating the detection reliability is based on a feature of information of the emergency vehicle included in a detection result, and includes a detection frequency of a siren sound in acoustic recognition, an amount of change in an acoustic direction of the siren sound, a frequency of change in the acoustic direction of the siren sound, a state of change in the acoustic direction of the siren sound including a degree of randomness, a volume of the siren sound, and vehicle recognition performance,
wherein the detection reliability is calculated using the following formula:

$$\text{Confidence}(S_1, S_2, \ldots, S_N) = w_1 * n_1 * S_1 + w_2 * n_2 * S_2 + \ldots + w_{N-2} * n_{N-2} * S_{N-2} + w_{N-1} * n_{N-1} * S_{N-1} + w_N * n_N * S_N, \text{ and}$$

wherein a weight is given based on a recognition rate of the siren sound, a recognition accuracy, or a classification accuracy of the emergency vehicle in the acoustic recognition, and n is a correction value by noise prediction and is given based on a noise level, a signal-to-noise ratio, and a degree of shielding by surrounding buildings.

10. The one or more non-transitory computer readable media according to claim 9, wherein the operations further comprise:
calculating a prediction reliability that shows a reliability of a predicted trajectory of the emergency vehicle, and the determining how to deal with the emergency vehicle includes:
causing the vehicle to take the avoidance action for the emergency vehicle when the detection reliability exceeds the first threshold and the prediction reliability exceeds a second threshold; and
causing the vehicle to take the preliminary action while the detection reliability is less than the first threshold or the prediction reliability is less than the second threshold.

11. The one or more non-transitory computer readable media according to claim 9, wherein the vehicle is configured to be able to be operated by remote or manual driving, the operations further comprise:
calculating a confidence level that shows confidence in completing the avoidance action for the emergency vehicle, and
the determining how to deal with the emergency vehicle includes:
causing the vehicle to take the avoidance action for the emergency vehicle when the detection reliability exceeds first threshold and the confidence level exceeds a third threshold;
switching operation of the vehicle to the remote or the manual driving when the detection reliability exceeds the first threshold and the confidence level is less than the third threshold; and
causing the vehicle to take the preliminary action while the detection reliability is less than the first threshold.

* * * * *